US012640920B2

(12) United States Patent
Hunacek et al.

(10) Patent No.: US 12,640,920 B2
(45) **Date of Patent: *May 26, 2026**

(54) CRYPTOGRAPHIC KEY CONFIGURATION USING PHYSICAL UNCLONABLE FUNCTION

(71) Applicant: NAGRAVISION SARL, Cheseaux-sur-Lausanne (CH)

(72) Inventors: Didier Hunacek, Cheseaux-sur-Lausanne (CH); Marco Macchetti, Cheseaux-sur-Lausanne (CH); Jerome Perrine, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 91 days.

This patent is subject to a terminal disclaimer.

(21) Appl. No.: 18/616,542

(22) Filed: Mar. 26, 2024

(65) Prior Publication Data

US 2024/0305455 A1      Sep. 12, 2024

Related U.S. Application Data

(63) Continuation of application No. 17/256,673, filed as application No. PCT/EP2019/066456 on Jun. 21, 2019, now Pat. No. 11,985,236.

(30) Foreign Application Priority Data

Jun. 29, 2018    (EP) ..................................... 18180951

(51) Int. Cl.
H04L 9/08        (2006.01)
H04L 9/32        (2006.01)

(52) U.S. Cl.
CPC .......... H04L 9/0866 (2013.01); H04L 9/0841 (2013.01); H04L 9/3278 (2013.01)

(58) Field of Classification Search
CPC .... H04L 9/0866; H04L 9/0841; H04L 9/3278
See application file for complete search history.

(56) References Cited

U.S. PATENT DOCUMENTS

| | | | | |
|---|---|---|---|---|
| 8,918,647 B1 | 12/2014 | Wallrabenstein | | |
| 2014/0258736 A1* | 9/2014 | Merchan | ............... | H04L 9/0866 |
| | | | | 713/193 |
| 2015/0113275 A1* | 4/2015 | Kim | ..................... | H04L 9/0877 |
| | | | | 713/169 |
| 2016/0110571 A1* | 4/2016 | Jung | ..................... | H04L 9/3263 |
| | | | | 340/10.1 |

(Continued)

*Primary Examiner* — Sangseok Park
(74) *Attorney, Agent, or Firm* — POLSINELLI LLP

(57)        ABSTRACT

The disclosure relates to a method of obtaining a cryptographic key in a chipset (1). An initial configuration message may be generated using a physical unclonable function (hereinafter: PUF) (22) of the chipset (1). Said PUF (22) may generate a predetermined value when using the initial configuration message as input to the PUF (22). The initial configuration message may be transmitted to a client access server (31). An altered configuration message may be received from the client access server (31), wherein the altered configuration message is generated by the client access server (31) based on the initial configuration message. The cryptographic key may be obtained from the PUF (22) using the altered configuration message as input to the PUF (22).

20 Claims, 4 Drawing Sheets

(56)                          References Cited

U.S. PATENT DOCUMENTS

| | | |
|---|---|---|
| 2017/0063559 A1 | 3/2017 | Wallrabenstein |
| 2017/0310489 A1 | 10/2017 | Van Der Sluis et al. |
| 2019/0114115 A1* | 4/2019 | Wille ................. G06K 19/0723 |
| 2019/0116028 A1* | 4/2019 | Liu ....................... H04L 9/0866 |
| 2019/0158299 A1 | 5/2019 | Poo et al. |
| 2019/0165954 A1 | 5/2019 | Lu |

* cited by examiner

1

CRYPTOGRAPHIC KEY CONFIGURATION USING PHYSICAL UNCLONABLE FUNCTION

CROSS-REFERENCES TO RELATED APPLICATIONS

This application is a continuation of U.S. patent application Ser. No. 17/256,673 filed Dec. 29, 2020, which is a national stage entry of PCT/EP2019/066456 filed Jun. 21, 2019, which claims priority to European Patent Application No. 18180951.8 filed Jun. 29, 2018, the entire contents of each which are incorporated herein by reference in their entirety for all purposes.

TECHNICAL FIELD

This disclosure generally relates to securing functionality of a device. More specifically, this disclosure relates to devices having a physical unclonable function which can use helper data to secure the device.

BACKGROUND ART

Physical Unclonable Functions (PUFs) correspond to fabricating a particular circuit on an integrated circuit chip, such as e.g. a silicon integrated circuit chip, to create a random (unique) substantially unclonable data value for the chip. PUFs are typically used in identification, cryptographic or authentication applications.

A PUF is a circuit typically built out of standard logic primitives used in semiconductor technology. The inputs to the PUF are digital inputs (0/1) and the outputs are digital outputs (0/1). However, the function implemented by the PUF typically depends on the small variations of the production process of the individual gates and wires. Circuits are fabricated onto silicon, or any other suitable material, by creating layout masks for the circuit. When the PUF is fabricated on many chips, e.g. by using the same set of layout masks for each chip, due to statistical variation in the manufacturing process, the delays of gates and wires vary from chip to chip. The PUF functionality is such that a digital output is produced based on the relative delays of paths in the PUF. Therefore, when inputs (challenges) are applied to the different chips, they produce different outputs (responses).

A PUF may be used in challenge-response authentication. When a physical stimulus is applied to the PUF implementation, each instance of the PUF reacts in a unique way due to the presence of its random physical characteristics introduced by the manufacturing process. The applied stimulus is called the challenge, and the reaction of the PUF is called the response. A specific challenge and its corresponding response together form a challenge-response-pair (CRP).

PUFs are substantially unclonable due to the fact that each PUF has a unique and unpredictable set of manufacturing variations. Two PUFs that were manufactured with the same process will still possess a unique challenge-response behavior. Physical cloning of a PUF is very hard because exact control over the manufacturing process—such that all parameters of the physical structure can be exactly defined—is substantially impossible. This unclonability property ensures that it is very hard to construct a PUF with the same challenge-response behavior as another PUF. In addition, it is difficult to compute an unknown response given the exact parameters or other CRPs from the PUF. This is because a response is created as a very complex interaction of the challenge with the random components. Modeling this interaction, even if the random values would be known, takes a lot of computational effort. Thus, it is extremely difficult to produce a software clone of the PUF. One could use cryptographic techniques (such as encryption and hashing) to ensure that it is computationally infeasible for an attacker to predict the value of a new response given many previous challenge/response pairs. Therefore, one can couple the PUF circuit with cryptographic functions.

PUFs may provide a unique cryptographic key for a particular chip without the need for one-time programmable memory. One-time programmable memory is usually relatively expensive, and physical unclonable functions may thus provide a cost-efficient alternative. However, PUF algorithms are not always stable and may need helper data to be able to repeatedly and safely generate the same unique cryptographic key. Helper data is typically stored on external memory, like an external flash chip, and provided to the PUF block when the cryptographic key needs to be used.

Helper data generation is usually performed in a controlled environment and implies access to a special characterization mode of the PUF. This is ideally done during chip or wafer testing, when chips can be put in a special test mode. However, this implies an increase in test time, which will thus ultimately result in an increase in silicon costs.

SUMMARY

According to an aspect of the disclosure, a method is proposed where a cryptographic key can be obtained in a chipset. An initial configuration message can be generated by using a physical unclonable function (hereinafter: PUF) of the chipset. Said PUF can generate a predetermined value when using the initial configuration message as input to the PUF. The initial configuration message can be transmitted to a client access server. An altered configuration message can be received from the client access server. Here, the altered configuration message can be generated by the client access server based on the initial configuration message. The cryptographic key can be obtained from the PUF using the altered configuration message as input to the PUF.

In this way, no access is needed to a special characterization mode of the PUF for setting the cryptographic key and thus test time of the chipset can be reduced which decreases the production costs. Furthermore, the cryptographic key can be used to secure the chipset.

In an embodiment, the PUF can be part of a secure part of the chipset.

In this way, any data paths over which data is transmitted from and to the PUF can be more secure.

In an embodiment, the secure part can encrypt and store the altered configuration message.

In this way the altered configuration message is stored in a secure way and is protected from malevolent or unauthorized use.

In an embodiment, a secure link can be set up between the secure part and the client access server. The initial configuration message and the altered configuration message can be transmitted via the secure link.

In this way, the link between the secure part and the client access server is more secure.

In an embodiment, the cryptographic key may be transmitted by the client access server to the device over the secure link, and the device is making the necessary alterations to the configuration message without the need to transmit it.

In an embodiment, the device may generate the cryptographic key by means of a random number generator, and the cryptographic key may be transmitted to the client access server over the secure link; the corresponding configuration message is stored in device flash memory.

In an embodiment, the secure link can be implemented using a Diffie-Hellman key exchange.

In this way, the client access server knows that it is interfacing with a genuine chip and the secure parts knows that it is connected to a genuine client access server.

In an embodiment, the cryptographic key is used to bootstrap security measures of the chipset.

In this way, the chipset can be made more secure. Since the PUF is chipset dependent, security is better.

In an embodiment, the cryptographic key can be used as a root key in a key ladder to obtain further cryptographic keys.

In this way, the other cryptographic keys in the key ladder are more secure.

In an embodiment, information about the authenticity, serial number, origin or production of the chipset can be transmitted to the client access server. The altered configuration message can be received from the client access server depending on the information.

In this way, even if an attacker has fully reversed the chipset and can connect to the client access server and perform the protocol, the client access server will not send the key to particular chipsets based on this information.

According to an aspect of the invention, a device is proposed comprising a processor that can be configured to perform the steps of the method according to any of the above embodiments.

According to an aspect of the invention, a device is proposed comprising an integrated circuit that can be configured to perform the steps of the method according to any one of the above embodiments.

In an embodiment, the device is an internet-of-things device.

According to an aspect of the invention, a computer program product is proposed implemented on a computer-readable non-transitory storage medium, the computer program product can comprise computer executable instructions which, when executed by a processor, can cause the processor to carry out the steps of the method according to any one of the above embodiments.

According to an aspect of the invention, a computer-readable non-transitory storage medium is proposed comprising computer executable instructions which, when executed by a processor, can cause the processor to carry out the steps of the method according to any one of the above embodiments.

BRIEF DESCRIPTION OF THE DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Hereinafter, embodiments will be described in further detail. It should be appreciated, however, that these embodiments may not be construed as limiting the scope of protection for the present disclosure.

Where in the following examples reference is made to a client device, it is to be understood that the disclosure is not limited to application in client devices.

Figure 1:
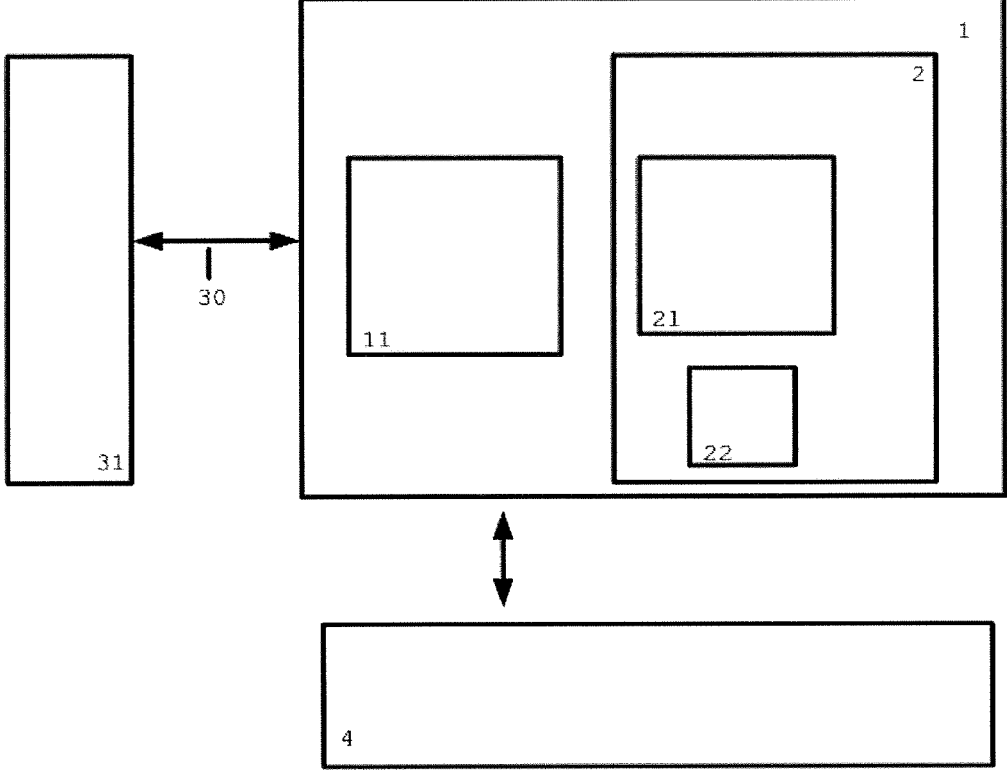
FIG. 1 shows a schematic of a device that is communicatively connected to a server of an embodiment according to the invention.

FIG. 1 shows an exemplary embodiment of a device 1 that is communicatively connected to a server via a network. The device 1 may include a secure part, also called a secure enclave 2, which is typically the most secure hardware block on the device. The secure enclave 2 may have its own, independent secure boot process to ensure that it is completely secure, and it may execute specific secure functions.

The secure enclave 2 may have a physical unclonable function (PUF) block 22, which serves as a unique identity for the device. The PUF block 22 may also be positioned outside the secure enclave 2. PUFs are typically based on physical variations which occur naturally during semiconductor manufacturing. These variations are unpredictable and uncontrollable, which advantageously makes it almost impossible to duplicate the structure.

By providing helper data as challenge, the PUF on the PUF block 22 may output a cryptographic key as response. This cryptographic key may be used to bootstrap the device's security. The cryptographic key may be used with a public or secret cryptographic algorithm to perform key ladder functionality. As an example, it may be used as a root key in a key ladder to further decrypt (and use) other keys.

In order to generate the correct helper data, a client access server 31 may be used. The client access server 31 may be a server that handles multiple clients, including the device. The device may communicate with the client access server 31 via a network. The secure enclave 2 may initialize a secure link with the client access server 31. In this way, both the secure enclave 2 and the client access server 31 may be sure that the data over the secure link is communicated between the correct receiver/sender. An example of an implementation of such secure link between the client access server 31 and the secure enclave 2 is based on the Diffie-Hellman key exchange protocol. An embodiment using the Diffie-Hellman key exchange protocol in the context of the present disclosure will be described in more detail using FIG. 2.

Figure 2:
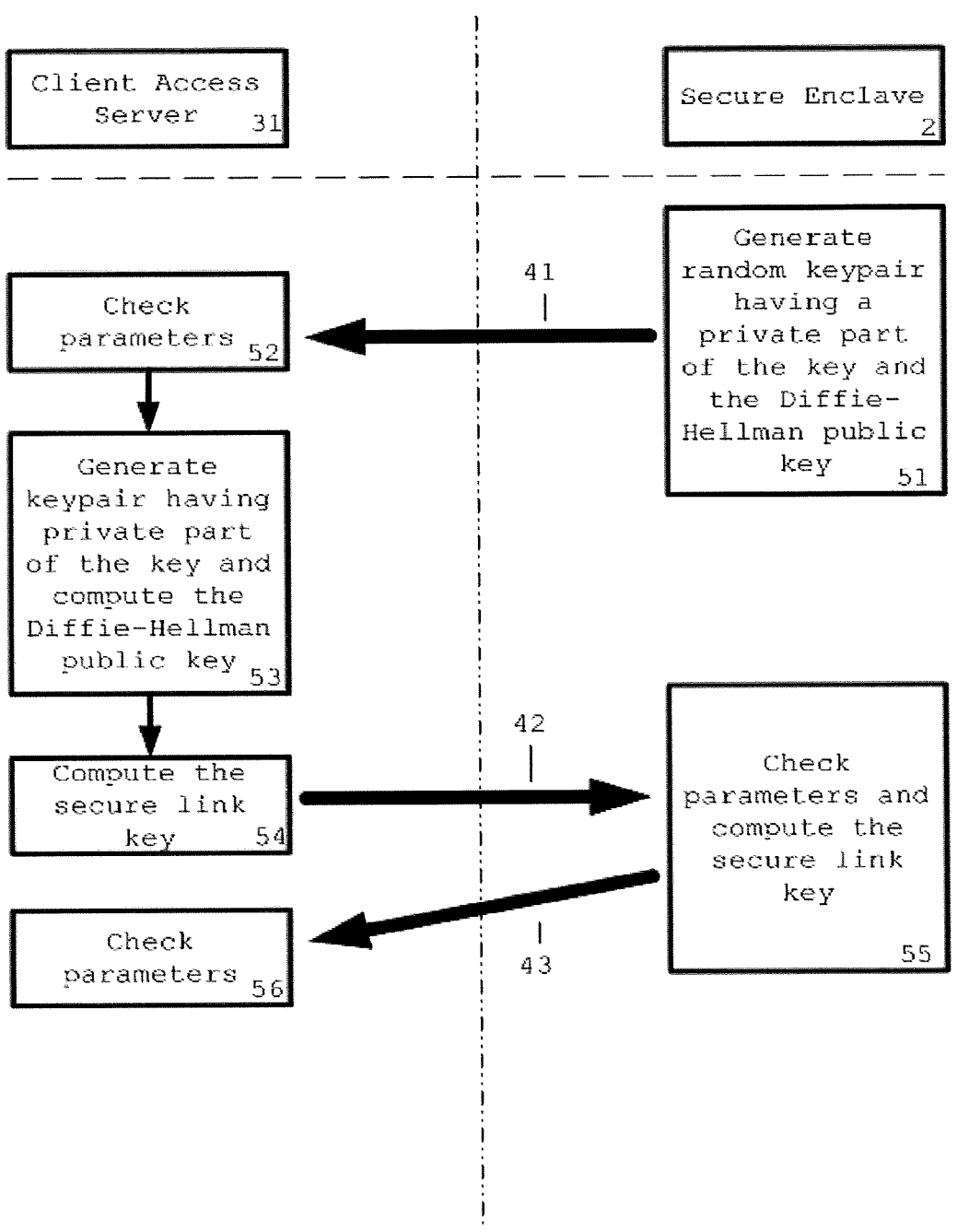
FIG. 2 shows a schematic depiction of an implementation of the Diffie-Hellman protocol.

FIG. 2 shows a schematic depiction of an example of an implementation of the Diffie-Hellman key exchange protocol. After the secure enclave 2 is for example prompted to initialize the secure link, the secure enclave 2 generates 51 a random key pair, consisting of a private part of the key (private device key) and a public part of the key (public device key). This usually is a random key pair. The private device key may be a nonce (a number or bit string used only once for cryptography purposes). The public device key may be computed based on the private device key.

The secure enclave 2 may transmit 41 the public device key to the client access server 31. This transmission may be direct, or may go via another, less secure part of the device 1. The secure enclave 2 may also transmit its unique ID or the unique ID of the device 1 to the client access server 31.

The client access server 31 may check this unique ID belonging to the device 1 or the secure enclave 2 to verify the identity of the secure enclave 2 that is trying to establish a secure link with the client access server 31, and probably verify that the unique ID belongs to an actual produced chip. Furthermore, the secure enclave 2 may sign the transmission 41 with a signature. This may be used to check authentication, non-repudiation and that the message has not been altered after transmission.

Upon receiving the transmission 41, the client access server 31 may check the parameters of the transmission 42. This means for example checking the signature or the unique ID transmitted by the secure enclave 2.

Next, the client access server 31 may generate 53 a key pair, comprising a private part of the key (private server key) and a public part of the key (public server key). This may be a random key pair. The private server key may be a nonce, and the public server key may be computed based on the private server key.

Next, the client access server 31 may compute 54 a secure link key, based on the public device key and the private server key. This secure link key may be used to secure the secure link to be formed between the client access server 31 and the secure enclave 2.

The client access server 31, upon computing the secure link key, may transmit 42 the public server key to the secure enclave 2. This transmission 42 may be performed via a less secure part of the device 1, or directly to the secure enclave 2. The client access server 31 may also transmit its server certificate, which is used to prove that the public server key sent via the transmission 42 is indeed owned by the client access server 31. Furthermore, the client access server 11 may sign the transmission 42 with its signature.

Upon receiving the transmission 42, the secure enclave 2 may check 55 the parameters of the transmission 42 (signature, server certificate) and may compute the secure link key based on the private key of the secure enclave 2 and the public key of the client access server 31. Now, both the secure enclave 2 and the client access server 31 may agree on the secure link key. This key may then be used to encrypt and decrypt data transmitted over the secure link between the secure enclave 2 and the client access server 31.

The secure enclave 2 may send 43 a secure enclave certificate, for example signed with a signature upon computing the secure link key, to show for example that the secure enclave 2 has computed the secure link key.

Once the secure link between the client access server 31 and the secure enclave 2 has been established (after checking 56 the parameters of transmission 43), the secure enclave 2 may generate an initial configuration message comprising helper data, which, when applied to the PUF, may result in the generation of a predetermined value, e.g. a null key.

The generation of the configuration message is done using e.g. the secure enclave CPU 21.

Next, the initial configuration message may be sent via the secure link to the client access server 31. Since the configuration message is send via the secure link, only the secure enclave 2 and the client access server 31 may have access to it. It may therefore not be modified or stolen by any potential attackers.

The client access server 31 may receive the initial configuration message via the secure link. The server typically can determine the physical unclonable function present in the PUF, because the initial configuration message may result in the generation of the predetermined value, e.g. the null key. As a simple example, let us say that the physical unclonable function can be mathematically represented as the function f for which $f(x)=2x-2x_i$, with x being the configuration message and $f(x)$ the cryptographic key belonging to the configuration message x. The null key can be represented by $f(x)=0$, and the configuration message x which solves this equation is the initial configuration message $x_i$, i.e. $f(x_i)=0$. The client access server 31 may only know the physical unclonable function up to a constant, e.g. as $f(x)=2x+c$, where c is an unknown constant. However, by filling in the value for the initial configuration message $x_i$ in the example where the predetermined value is the null key, one obtains: $f(x_i)=0=2x_i+c$, and hence $c=-2x_i$. Hence, the client access server 31 has determined the physical unclonable function to be $f(x)=2x-2x_i$. Note that this is a simple example, the actual implementation may be different.

Thus, based on the initial configuration message and the known particular cryptographic key that said function has as output, the client access server 31 may derive which altered configuration message leads to a (different) particular key. This new key is called the unique cryptographic key, and is thus attributed by the server. The chosen value of the unique cryptographic key may be generated, derived, listed or produced in any convenient way by the server.

Once the server has derived the altered configuration message that, when inputted into the physical unclonable function, gives as a result the unique cryptographic key, the server may send this altered configuration message over the secure link to the secure enclave 2.

The secure enclave 2, upon receiving the altered configuration message, may encrypt this altered configuration message using for example a hardwired global key and may store the encrypted configuration message into an external memory 4, e.g. an external flash memory chip, with the aid of a main CPU 11 of the data processing device 1.

When the altered configuration message is stored in flash, the data processing device 1 may load and if needed decrypt the altered configuration message for use with the physical unclonable function block 22 to generate a unique cryptographic key. The unique cryptographic key may be used by the device 1 to bootstrap further security measures. For example, the unique cryptographic key may be used to set up further secure connections to one or more other servers, or as a root key in a key ladder to decrypt and use further cryptographic keys.

The value of the unique cryptographic key is generally not known to the CPU 21 of the secure enclave 2, since the unique cryptographic key can only be generated by the PUF block 22.

Advantageously, an attacker who compromises the server or the device cannot gain knowledge about the unique cryptographic key from observing the protocol, nor can the attacker perform 'man in the middle' attacks to obtain the unique cryptographic key.

Moreover, an attacker who reads the configuration message from the external memory 4 will not be able to gain knowledge about the unique cryptographic key, because the attacker lacks access to and knowledge on the physical characteristics of the PUF block 22.

Moreover, an attacker who has access to the data processing device 1 cannot execute or replay the protocol. The attacker will not be able to generate the server-side signature, and the unique identification of the data processing device 1 is generated randomly each time by the device, as explained for the Diffie-Hellman protocol above.

Moreover, an attacker with accesses the server will not be able to run or rerun the protocol to obtain the unique cryptographic key, since the attacker will not be able to generate the signature of the data processing device 1.

In case an attacker has fully reversed the data processing device 1 and has fully recorded all exchanges between the chipset 1 and the client access server 31, the attacker still cannot gain knowledge of the unique cryptographic key.

As a further counter measure against obtaining the unique cryptographic key, the data processing device 1 may include a serial number or any other identification data, which may be used during the protocol request. By e.g. only allowing the client access server 31 to send the configuration message once to a device 1 with a particular serial number, and by checking whether the given serial number belongs to a produced chip, it can be avoided that an attacker performs a brute force attack on the client access server 31 and the PUF. Alternatively or additionally from a serial number, any notice of origin, authenticity or production information may be used to further identify the device 1.

Figure 3:
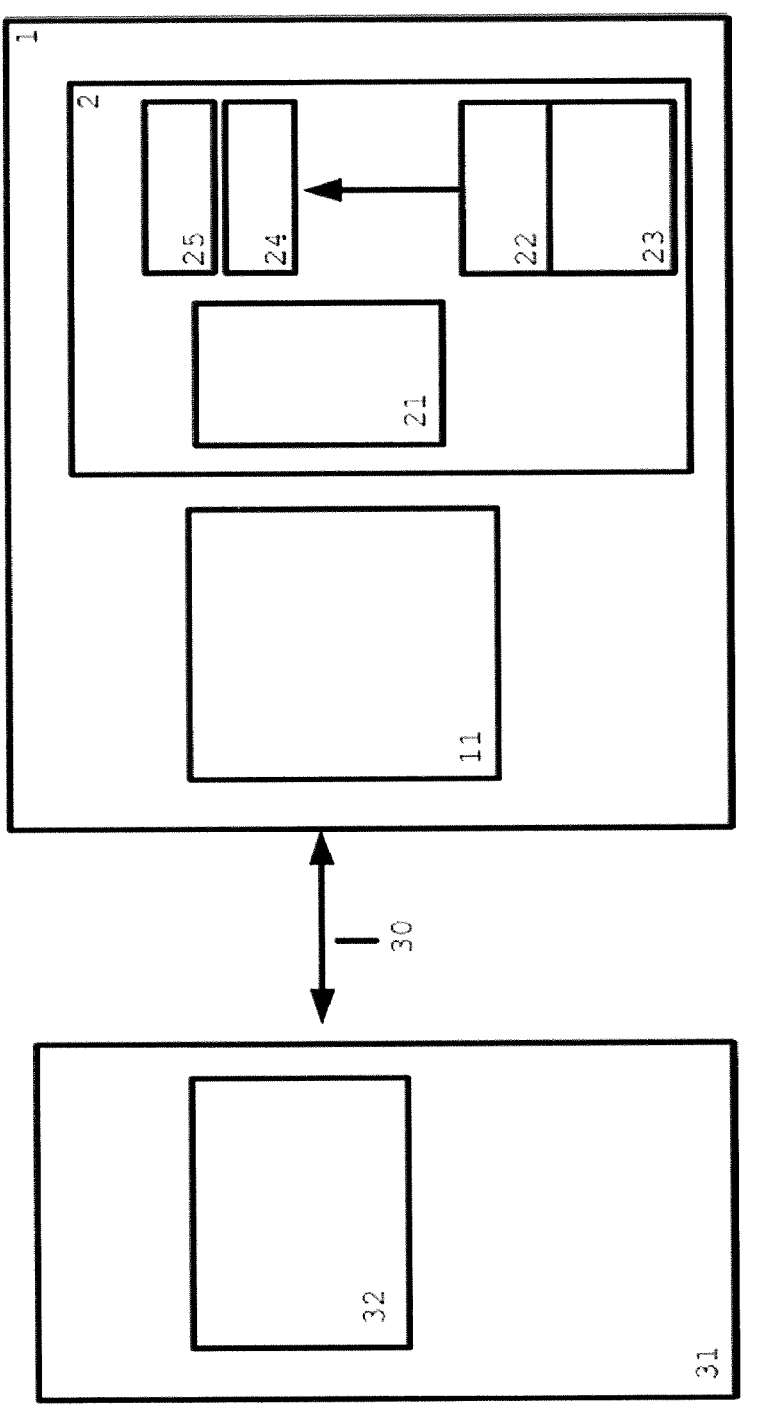
FIG. 3 shows a schematic of a device that is communicatively connected to a server of another embodiment according to the invention.

FIG. 3 shows another exemplary embodiment of a device 1 that is communicatively connected to a server 31 via a network. This exemplary embodiment is similar to the exemplary embodiment of FIG. 1, apart from the following.

In FIG. 3, the server 31 may include a key provisioning module 32 which may be used to alter the initial configuration message sent from the device 1 to the client access server 31 via the secure link. The key provisioning module 32 typically can determine the physical unclonable function, based on the configuration message and the known particular cryptographic key that said function has as output. Thus, the key provisioning module 32 may derive which altered configuration message leads to the unique key, and is thus attributed by the key provisioning module 32. The chosen value of the unique cryptographic key may be generated, derived, listed or produced in any convenient way by the key provisioning module 32.

Once the key provisioning module 32 has derived the configuration message that, when inputted into the physical unclonable function gives as a result the unique cryptographic key, the server 31 may send the configuration message over the secure link to the secure enclave 2.

It will be well understood that this embodiment is not a limited example, and the key itself may be transmitted over the secure link instead of the configuration message. For example, the cryptographic key may be transmitted by the client access server to the device over the secure link, and the device is making the necessary alterations to the configuration message without the need to transmit it. In another example, the device may generate the cryptographic key by means of a random number generator, and the cryptographic key may be transmitted to the client access server over the secure link; the corresponding configuration message is stored in device flash memory.

In an embodiment, the unique cryptographic key obtained via the PUF block 22 from the altered configuration message may be input to and used by an AES (Advanced Encryption Standard) crypto core 24, an ECC (Elliptic Core Cryptography) crypto core, or both. The unique cryptographic key may thus be used e.g. as an initialization vector for the cryptographic function performed by the crypto core. Use of the unique cryptographic key is not limited to AES and/or ECC crypto cores. It is possible to use other cryptographic functions or other crypto cores instead.

In an embodiment, ring oscillators 23 may be implemented in the PUF block 22. The PUF block 22 may be based on any number of ring oscillators 23.

Figure 4:
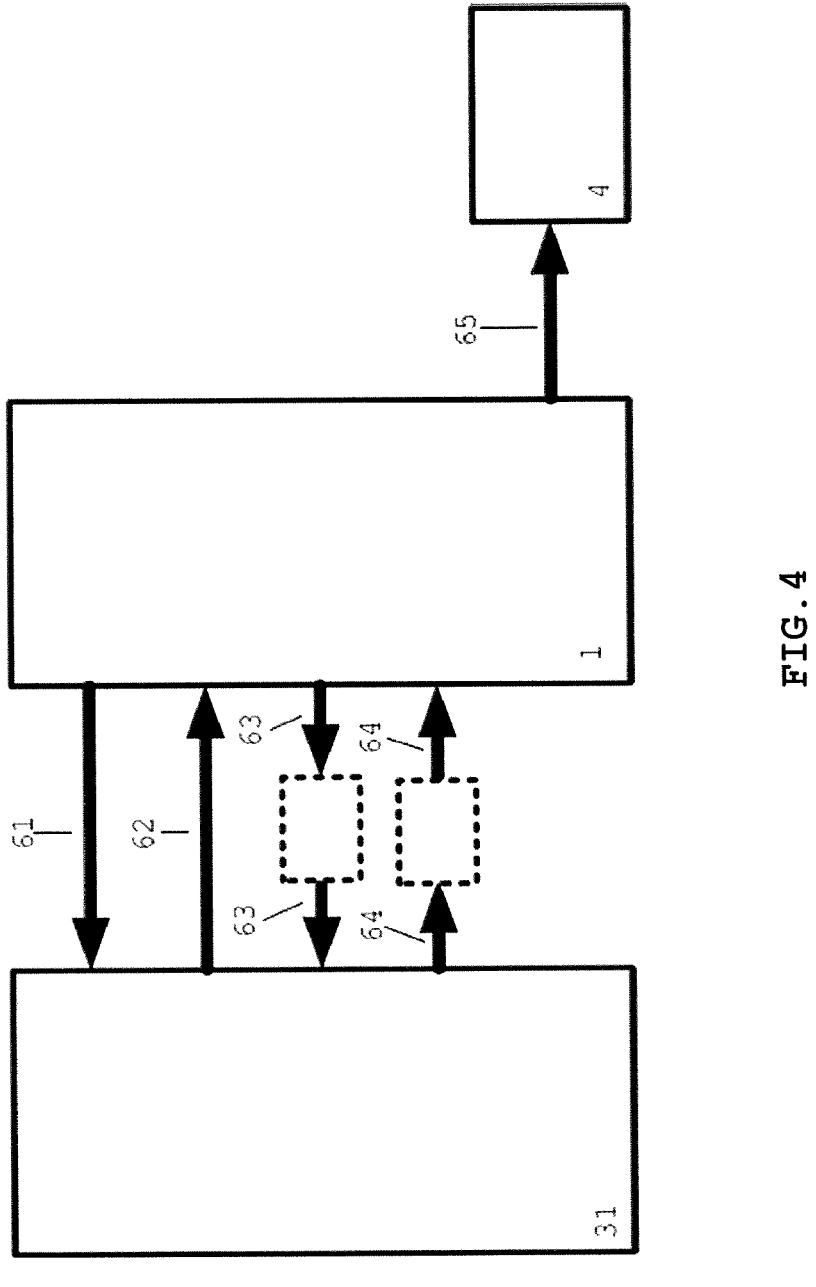
FIG. 4 shows a schematic depiction of an implementation of the PUF key provisioning protocol.

FIG. 4 shows a schematic depiction of an implementation of the PUF key provisioning protocol.

The secure link may be initialized by sending an initialization request 61 from the device 1 to the client access server 31. As in the other embodiments, the secure link may be based on the Diffie-Hellman protocol, or any other secure link protocol. The client access server 31, upon receiving the initialization request 61 and checking the parameters that may be send with the initialization request 61, may establish the secure link by transmitting an establish message 62 to the device 1. After the device 1 has checked the parameters of the establish message 62, the device 1 may send the configuration message comprising helper data, which, when applied to the PUF, results in the generation of a predetermined value, e.g. a null key. This transmission 63 is typically done via the established secure link. The client access server 31, upon receiving the configuration message from the transmission 63, may alter the configuration message, so that the altered configuration message, when inputted into the physical unclonable function, gives as a result the unique cryptographic key. The client access server 31 may then send transmission 64 via the secure link, containing the altered configuration message to the device 1. The device 1, upon receiving the configuration message, may encrypt the configuration message using for example a hardwired global key and may store 65 the encrypted configuration message into an external memory 4, e.g. an external flash memory chip.

One or more embodiments may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media, e.g., hard disk drive or any type of solid-state random-access semiconductor memory, flash memory, on which alterable information may be stored.

Two or more of the above embodiments may be combined in any appropriate manner.

What is claimed is:

1. A method for generating a key, the method comprising:
receiving, at a server, from a device, an initial configuration message, the initial configuration message generated using a physical unclonable function (PUF) of a chipset of the device, wherein the PUF is configured to generate a predetermined value when using the initial configuration message as input to the PUF;
determining, at the server, the PUF based on the initial configuration message and the predetermined value;
generating, at the server, an altered configuration message based on the PUF, wherein the PUF is configured to generate a cryptographic key when using the altered configuration message as input to the PUF; and
sending, from the server, to the device, the altered configuration message.

2. The method of claim 1, further comprising setting up a secure link between a secure part of the device and the server, wherein the initial configuration message and the altered configuration message are transmitted via the secure link.

3. The method of claim 2, wherein the secure link is implemented using an authenticated Diffie-Hellman key exchange protocol.

4. The method of claim 1, further comprising:

setting up a secure link between a secure part of the device and the server; and transmitting the cryptographic key via the secure link.

5. The method of claim 4, wherein the secure link is implemented using an authenticated Diffie-Hellman key exchange protocol.

6. The method of claim 1, wherein the device is configured to use the cryptographic key to bootstrap security measures of the device.

7. The method of claim 1, wherein the cryptographic key is used as a root key in a key ladder to obtain one or more further cryptographic keys.

8. The method of claim 1, further comprising using the cryptographic key as a root ladder to generate one or more further cryptographic keys.

9. The method of claim 1, further comprising receiving, at the server, information about at least one of: an authenticity, a serial number, an origin, or a production of the chipset of device, wherein the altered configuration message is generated based on the information.

10. The method of claim 1, wherein the device comprises an internet-of-things device.

11. An apparatus for generating a key, the apparatus comprising:

at least one memory; and at least one processor coupled to the at least one memory and configured to:

receive, from a device, an initial configuration message, the initial configuration message generated using a physical unclonable function (PUF) of a chipset of the device, wherein the PUF is configured to generate a predetermined value when using the initial configuration message as input to the PUF;

determine the PUF based on the initial configuration message and the predetermined value;

generate an altered configuration message based on the PUF, wherein the PUF is configured to generate a cryptographic key when using the altered configuration message as input to the PUF; and send to the device, the altered configuration message.

12. The apparatus of claim 11, wherein the at least one processor is configured to set up a secure link between a secure part of the device and the apparatus, wherein the initial configuration message and the altered configuration message are transmitted via the secure link.

13. The apparatus of claim 11, wherein the at least one processor is configured to:

set up a secure link between a secure part of the device and the apparatus; and transmit the cryptographic key via the secure link.

14. The apparatus of claim 11, wherein the device is configured to use the cryptographic key to bootstrap security measures of the device.

15. The apparatus of claim 11, wherein the cryptographic key is used as a root key in a key ladder to obtain one or more further cryptographic keys.

16. The apparatus of claim 11, wherein the at least one processor is configured to use the cryptographic key as a root ladder to generate one or more further cryptographic keys.

17. The apparatus of claim 11, further comprising receiving information about at least one of: an authenticity, a serial number, an origin, or a production of the chipset of device, wherein the altered configuration message is generated based on the information.

18. The apparatus of claim 11, wherein the device comprises an internet-of-things device.

19. The apparatus of claim 11, wherein the apparatus comprises a server.

20. A non-transitory computer-readable storage medium having stored thereon instructions that, when executed by at least one processor, cause the at least one processor to:

receive, from a device, an initial configuration message, the initial configuration message generated using a physical unclonable function (PUF) of a chipset of the device, wherein the PUF is configured to generate a predetermined value when using the initial configuration message as input to the PUF;

determine the PUF based on the initial configuration message and the predetermined value;

generate an altered configuration message based on the PUF, wherein the PUF is configured to generate a cryptographic key when using the altered configuration message as input to the PUF; and send to the device, the altered configuration message.

\* \* \* \* \*